Feb. 10, 1931.  E. KERN  1,792,099
PROTECTIVE APPARATUS FOR RECTIFIERS
Filed March 25, 1926
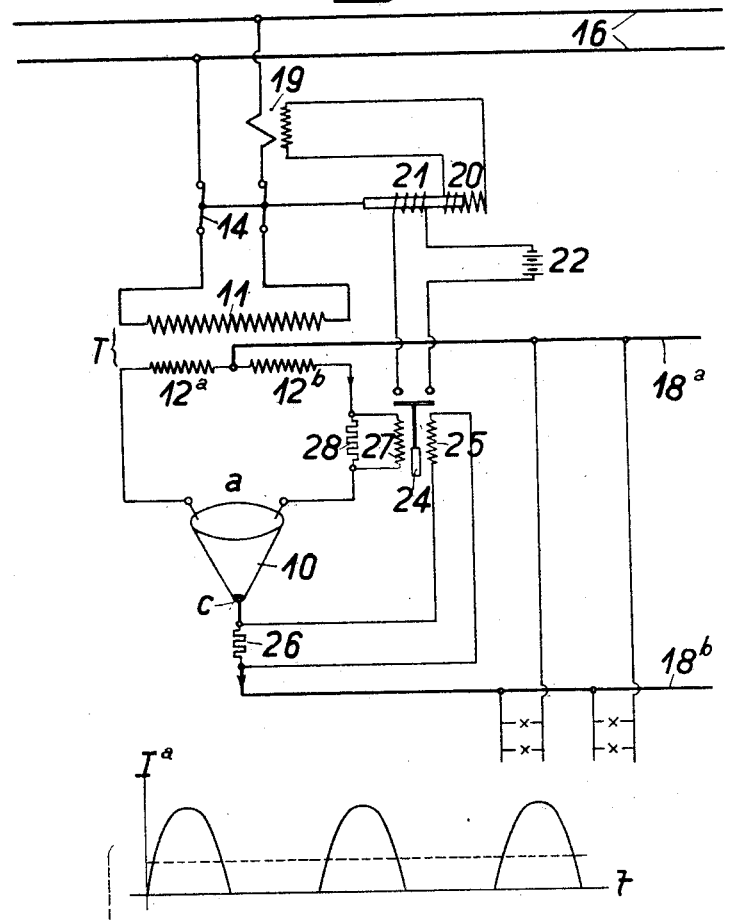
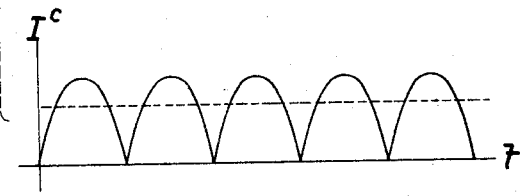

Patented Feb. 10, 1931

1,792,099

UNITED STATES PATENT OFFICE

ERWIN KERN, OF WETTINGEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

PROTECTIVE APPARATUS FOR RECTIFIERS

Application filed March 25, 1926, Serial No. 97,419, and in Germany April 6, 1925.

This invention relates generally to apparatus for protection of electrical installations from overloads and the like, and finds particular utility in the protection of apparatus wherein asymetric rectifiers, as of the mercury vapour type, are employed.

The general object of the invention is the provision of apparatus which is reliable in operation for the cutting out of individual rectifiers or the like, without interference with the operation of others which may not be subject to the abnormal condition obtaining in the affected unit.

A particular object of the invention is the provision of selectively operable apparatus which will be reliable to exercise the desired detecting function when dependent on the output current of rectifiers of the mercury vapour type.

Other objects and advantages of the invention will be pointed out or indicated hereinafter or obvious to one skilled in the art upon an understanding of the invention from the present disclosure.

In the drawing forming a part of this specification I show diagrammatically one arrangement of apparatus embodying the invention, but the same is presented for illustrative purposes only and is not to be accorded any interpretation limiting the claims short of their true and most comprehensive scope in the art.

In the drawing,

Fig. 1 is a diagrammatic illustration of an installation including a mercury vapour rectifier, its supply transformer and mechanism for protecting both against abnormal load conditions on the line or in the rectifier or transformer, and Fig. 2 is a curve diagram illustrating the form of the impressed and rectified current.

Metallic vapour rectifiers require some form of protective device which will safeguard the primary network, the transformers, the generators, the rectifiers themselves and the secondary system from the effects of short-circuits and back-fires. Hitherto it has been the practice to employ overload trips which isolated the system in the event of a short-circuit on the line or a back-fire in the rectifier. These switches did not operate selectively, however, and thus it often happened that a momentary short-circuit caused all the rectifiers to be cut out, the whole service to be interrupted for a back-fire in one rectifier. To prevent such wholesale disconnection of the rectifiers during a momentary short-circuit it was necessary to incorporate a time element with the overload trips. If this is done, however, there is a danger that parts of the rectifier may be severely damaged during a back-fire, even to the extent of being rendered unfit for further service.

Current transformers such as are used for selective protection of transformers cannot be used in the known way for the selective protection of rectifiers. The currents to be balanced in the case of rectifiers are not purely alternating, but are continuous or direct currents containing ripples of various frequencies. In Fig. 2, $I^a$ represents the anode current and $I^c$ the cathode current as functions of the time. It will be noticed that the ripple in the cathode current is of a higher frequency than that of the anode. If current transformers are inserted in the incoming and outgoing leads, i. e., in the anode and cathode circuits, in the usual way, the secondary currents of these two transformers will be of different frequencies and therefore not suitable for use with a balanced protective device when positive and certain operation is desired. The principal factors which determine the state of working of the rectifier are the D. C. components of the currents.

By the present invention I provide a protective device suitable for use with metallic vapour rectifiers in which the change in ratio of the direct currents entering and leaving the rectifier, which takes place during a back-fire, is employed to actuate the cut-out device and isolate the rectifier from the system. There are various ways of making use of these direct currents to obtain the desired result. Thus the anode and cathode currents may each be passed through a coil of a tripping device, but then in order to neutralize the effects of the two coils under normal working conditions of the rectifier it is necessary to take into account two direct currents and two superimposed ripples of different frequencies. A better arrangement is to more or less completely exclude the action of the ripples on the tripping gear, as is done in the illustrative example of the invention shown in Fig. 1.

In this embodiment, the rectifier is designated 10 and is supplied by a transformer T, the primary 11 of which is energized from the supply lines 16 through the switch 14. The secondary of the transformer is divided into the sections $12^a$ and $12^b$, each leading to one of the anodes $a$ of the rectifier, the neutral point between the sections being connected to the negative D. C. line $18^a$. The cathode $c$ of the rectifier is connected to the positive D. C. line $18^b$. The switch 14 is operable by an electromagnet which includes the coils 20 and 21, the first mentioned being effective on the occurrence of a predetermined overload through transformer 19, to open the switch, and the latter being operable to the same effect when energized from the source 22. Energization of coil 21 is controlled by the relay 24, which is rendered responsive to conditions in the rectifier through its D. C. coils 25 and 27.

A comparison of the anode and cathode direct currents is made with the help of the relay 24 which includes the two coils 25 and 27 traversed by the currents above mentioned. When the rectifier is working properly the effects of these two coils are neutralized. To ensure that pure direct currents only are being compared and to exclude the effect of ripples, the anode current and the cathode current are not passed directly to the windings 27 and 25, but shunts are inserted around small resistances 28 and 26 in the rectifier leads and the relay coils connected in these shunts. By adopting this type of connection each ripple current is provided with a short-circuited path, the ripple of the cathode current flowing in coil 25 generating a compensating current in its secondary circuit 27 and 28, and similarly the ripple of the anode current flowing in coil 27, for which the circuit 25 and 26 forms a secondary short-circuited path, inducing an alternating current in this secondary which neutralizes the original ripple at every instant. Thus the direct currents alone remain effective on relay 24 and by suitably choosing the ratio of the turns in coils 25 and 27 they may be made to cancel out. If an internal fault occurs (e. g., a back-fire) one of the currents will predominate and operate the relay 24 thus applying the auxiliary supply from 22 to the coil 21 of the tripping magnet. This opens the switch 14. The coils 20 and 21 can be provided with different time lags so that a longer period elapses before cutting out a short-circuit in the mains than when there is a back-fire in the rectifier. If a number of rectifiers are working in parallel and a back-fire occurs, the only rectifier to be cut out is the faulty one, which is a very great advantage from the operating point of view.

The illustrative example chosen shows a single-phase rectifier. The principle of the device remains the same, however, when applied to polyphase rectifiers.

What I claim is:

1. In an electrical power system, a rectifier, a source of supply therefor, a switch interposed between the rectifier and said supply, and means responsive to a predetermined differential condition between the anode and cathode currents of said rectifier and operable upon existence of such condition to effect opening of said switch.

2. In an electrical power system, a rectifier, a source of supply therefor, a switch interposed between the rectifier and said supply, and means responsive to a predetermined differential condition between the anode and cathode currents of said rectifier and operable upon existence of such condition to effect opening of said switch, said means operating independently of the relation between the respective frequencies of said currents.

3. In an electrical power system, a rectifier, a source of supply therefor, a switch interposed between said rectifier and the supply source, and a relay responsive to predetermined abnormal conditions in said rectifier and operable upon existence of such conditions to effect opening of said switch, said relay including inductively related windings, one of said windings being connected across a shunt resistor in the anode circuit of said rectifier, the other of said windings being connected across a shunt resistor in the cathode circuit of said rectifier.

4. In an electrical power system, a rectifier, a source of supply therefor, a switch interposed between said rectifier and the supply, a coil associated with said switch and operable upon being excited to effect opening thereof, an energizing circuit for said coil, and means responsive to a predetermined relation of anode and cathode currents of said rectifier for connecting said coil in the energizing circuit therefor.

5. In an electrical power system, a rectifier, a source of supply therefor, a switch interposed between said rectifier and the supply, a coil associated with said switch and operable upon being excited to effect opening thereof, an energizing circuit for said coil, and means responsive to a predetermined relation of anode and cathode currents of said rectifier for connecting said coil in the energizing circuit therefor, said means including inductively-associated coils connected respectively in shunt from the cathode and one of the anode circuits of said rectifier.

In testimony whereof I have hereunto subscribed my name at Zurich, Switzerland, on the 3rd day of March 1926.

ERWIN KERN.